US011756237B2

(12) United States Patent
Czymontek et al.

(10) Patent No.: US 11,756,237 B2
(45) Date of Patent: Sep. 12, 2023

(54) VEHICLE, PICKUP AND DROPOFF LOCATION IDENTIFICATION FOR RIDESHARING AND DELIVERY VIA AUGMENTED REALITY

(71) Applicant: GOOGLE LLC, Mountain View, CA (US)

(72) Inventors: Herbert Czymontek, Mountain View, CA (US); Dan Li, Mountain View, CA (US); Max Greenwald, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/609,034

(22) PCT Filed: Mar. 15, 2019

(86) PCT No.: PCT/US2019/022409
§ 371 (c)(1),
(2) Date: Oct. 28, 2019

(87) PCT Pub. No.: WO2020/190254
PCT Pub. Date: Sep. 24, 2020

(65) Prior Publication Data
US 2021/0407150 A1 Dec. 30, 2021

(51) Int. Cl.
*G06T 11/00* (2006.01)
*G06T 7/70* (2017.01)
(Continued)

(52) U.S. Cl.
CPC .......... *G06T 11/00* (2013.01); *G01C 21/3438* (2013.01); *G06Q 50/30* (2013.01);
(Continued)

(58) Field of Classification Search
None
See application file for complete search history.

(56) References Cited

U.S. PATENT DOCUMENTS 10,134,286 B1 * 11/2018 Elswick ................. G08G 1/205
2013/0116922 A1   5/2013 Cai et al.
(Continued)

FOREIGN PATENT DOCUMENTS

WO   WO-2018/081433 A1   5/2018
WO   WO-2018/183975 A1   10/2018

OTHER PUBLICATIONS

Notice of Reasons for Rejection for Japanese Application No. 2020-514599, dated Apr. 19, 2021.
(Continued)

*Primary Examiner* — Jeffrey J Chow
(74) *Attorney, Agent, or Firm* — MARSHALL, GERSTEIN & BORUN LLP

(57) ABSTRACT

To present a pickup location in a transportation service, a server device receives a request for ridesharing services from a rider's current location to a drop-off location. The server device broadcasts the request to drivers and receives an indication of acceptance of the request from one of the drivers. Then the server device provides a pickup location to the rider and the driver which is presented in a map display of the rider and driver's client devices. When the rider or driver's current location is within a threshold distance of the pickup location, the corresponding client device switches to an augmented reality mode and presents a camera view from a camera of the client device depicting real-world imagery. The server device provides information to the corresponding client device to present in the augmented reality mode overlaying the real-world imagery to assist the rider or driver in finding the pickup location.

16 Claims, 11 Drawing Sheets

(51) Int. Cl.
  *G06V 20/20* (2022.01)
  *G06V 10/75* (2022.01)
  *G01C 21/34* (2006.01)
  *G06Q 50/30* (2012.01)

(52) U.S. Cl.
  CPC .............. *G06T 7/70* (2017.01); *G06V 10/751* (2022.01); *G06V 20/20* (2022.01); *G06T 2200/24* (2013.01); *G06V 2201/08* (2022.01)

(56) References Cited

U.S. PATENT DOCUMENTS

| | | | |
|---|---|---|---|
| 2015/0310667 A1* | 10/2015 | Young | G06F 3/048 345/633 |
| 2016/0180602 A1 | 6/2016 | Fuchs | |
| 2017/0076482 A1* | 3/2017 | Liu | G06T 7/74 |
| 2017/0127215 A1* | 5/2017 | Khan | H04W 12/64 |
| 2017/0153714 A1 | 6/2017 | Gao et al. | |
| 2017/0213165 A1 | 7/2017 | Stauffer et al. | |
| 2018/0058863 A1* | 3/2018 | Meyer | G01C 21/3614 |
| 2018/0087918 A1* | 3/2018 | Yamashita | H04L 41/22 |
| 2018/0096445 A1 | 4/2018 | Eyler et al. | |
| 2018/0189713 A1 | 7/2018 | Matthiesen et al. | |
| 2018/0302743 A1 | 10/2018 | Bai et al. | |
| 2018/0365893 A1* | 12/2018 | Mullins | G02B 27/0172 |
| 2019/0017839 A1* | 1/2019 | Eyler | G01C 21/3407 |
| 2019/0063935 A1* | 2/2019 | Badalamenti | G01C 21/3438 |
| 2019/0065852 A1* | 2/2019 | Badalamenti | G06T 19/006 |
| 2019/0065855 A1* | 2/2019 | Lerman | G06T 7/70 |
| 2019/0072408 A1* | 3/2019 | Lee | H04L 67/52 |
| 2020/0151916 A1* | 5/2020 | Kenney | G01S 19/03 |
| 2020/0284607 A1* | 9/2020 | Mangal | G06V 20/584 |
| 2020/0363216 A1* | 11/2020 | Elvanoglu | G08G 1/005 |
| 2021/0092555 A1* | 3/2021 | Mayor | G06F 18/253 |
| 2021/0097866 A1* | 4/2021 | Leary | G01C 21/3438 |
| 2023/0048235 A1* | 2/2023 | Rogan | G06F 3/016 |

OTHER PUBLICATIONS

International Search Report and Written Opinion for Application No. PCT/US2019/022409, dated Dec. 18, 2019.
Office Action for Korean Application No. 10-2020-7005495, dated Aug. 20, 2021.
Examination Report for EP Application No. 19714028.8, dated Jan. 9, 2022.

* cited by examiner

VEHICLE, PICKUP AND DROPOFF LOCATION IDENTIFICATION FOR RIDESHARING AND DELIVERY VIA AUGMENTED REALITY

FIELD OF THE DISCLOSURE

The present disclosure relates to ridesharing systems and, more particularly, to using augmented reality to provide precise location information to ridesharing application users.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, ridesharing or carpooling providers connect drivers and passengers to arrange for a driver to transport a passenger to a destination. Typically, a ridesharing application presents a pickup location to the driver and the rider for picking up the rider.

A problem with ridesharing services is that it is sometimes difficult for a rider and the driver of a vehicle to identify each other. For example, a rider may be told the make, color, and license plate of the vehicle, and may be given an estimated location of the vehicle on a map on the rider's mobile device. However, the make and color of the vehicle may not be particularly helpful in identifying the correct vehicle, since there may be dozens of vehicles with the same make and color nearby in an urban environment. The license plate may difficult for a rider to read, particularly if the vehicle is more than a few meters away from the rider. Furthermore, the estimated location of the vehicle may be too inaccurate to assist the rider. The estimated location is typically based on a GPS measurement made by a mobile device in the driver's vehicle. Such GPS measurements may be inaccurate due to the low signal strength of the GPS signal in a built-in or enclosed environment, or due to deficiencies in the mobile device's GPS receiver.

Drivers typically receive even less information. For example, a driver may be given an approximate location of the rider and, depending on the ridesharing provider, an image of the rider. The approximate location of the rider is typically based on a GPS measurement made by a mobile device in the rider's possession and, therefore, suffers from similar sources of inaccuracy as those described in the context of the driver's location.

SUMMARY

To help the driver and rider identify each other, a ridesharing augmented reality (AR) system switches the display of a ridesharing application from a map display mode to an AR mode as the rider or the driver approaches the pickup location. The AR mode presents AR features overlaid on real-world imagery of an area captured by a camera of a rider or driver client device. More specifically, in the AR mode, the ridesharing AR system may present a camera view of real-world imagery in front of the rider or driver client device. The ridesharing AR system may then identify the locations included within the camera view and determine whether the locations include the pickup location and/or the current location of the rider or driver. When the camera view includes the pickup location, the ridesharing AR system may present an indication of the pickup location overlaying the real-world imagery at the position within the camera view corresponding to the pickup location. The indication may be a pin or other graphic placed at the position within the camera view corresponding to the pickup location.

When the camera view includes the driver's vehicle, the ridesharing AR system may present an indication of the vehicle overlaying the real-world imagery at the position within the camera view corresponding to the vehicle. For example, the ridesharing AR system may highlight the vehicle within the real-world imagery by placing a pin or arrow above the vehicle, placing a circle, square, or other shape around the vehicle, rendering a particular color over the vehicle, placing a graphic over or above the vehicle, etc. Similarly, when the camera view includes the rider, the ridesharing AR system may present an indication of the rider overlaying the real-world imagery at the position within the camera view corresponding to the rider. For example, the ridesharing AR system may highlight the rider within the real-world imagery by placing a pin or arrow above the rider, placing a circle, square, or other shape around the rider, rendering a particular color over the rider, placing a graphic over or above the rider, etc.

One example embodiment of the techniques of this disclosure is a method providing a display of a pickup location in a transportation service. The method includes receiving, in a server device, a request to transport a rider to a drop-off location, providing, to a client device of the rider or a client device of a driver, a pickup location for the driver to pick up the rider, and receiving real-world imagery from a field of view of the client device of the rider or the client device of the driver. The method further includes determining a location corresponding to the real-world imagery, comparing the determined location to the pickup location, and providing information to display in an augmented reality mode overlaying the real-world imagery presented on the client device of the rider or the client device of the driver based on the comparison to assist the rider or the driver.

Another example embodiment is a method for identifying and presenting a pickup location to a rider in a transportation service. The method includes transmitting, in a client device of a user, a request to transport the user to a drop-off location, and receiving a pickup location for a vehicle to pick up the user. The method further includes providing, via a user interface, an interactive digital map of a geographic area including an indication of the pickup location and an indication of a current location of the user in a map display mode. In response to determining that the current location of the user is within a threshold distance of the pickup location, the method includes switching, via the user interface, to an augmented reality mode that presents real-world imagery in a field of view of the client device along with information overlaying the real-world imagery to assist the user.

Yet another example embodiment is a method for identifying and presenting a pickup location to a driver in a transportation service. The method includes receiving, in a client device of a driver, a request to transport a rider or item to a drop-off location, accepting the request, and receiving a pickup location. The method further includes providing, via a user interface, an interactive digital map of a geographic area including navigation directions from a current location of the driver to the pickup location in a map display mode. In response to determining that the current location of the driver is within a threshold distance of the pickup location, the method includes switching, via the user interface, to an augmented reality mode that presents real-world imagery in a field of view of the client device along with information overlaying the real-world imagery to assist the driver.

DETAILED DESCRIPTION

Overview

The present disclosure provides techniques for improved identification of the rider and the driver in a transportation service. More specifically, the present disclosure uses augmented reality to help a rider and a driver identify each other when the rider and driver agree to share location and/or identity information. For example, augmented reality techniques may be used to indicate the driver's vehicle in a display of real-world imagery surrounding the rider's client device (and vice versa), so as to reduce or eliminate the need for the rider to identify the vehicle using eyesight alone. As another example, augmented reality techniques may be used to guide the driver and/or the rider towards a pickup location. The use of augmented reality can reduce the reliance upon GPS measurements when the rider and driver are attempting to locate each other. While the techniques are described herein with reference to a pickup location, similar techniques may also be used to identify a drop-off location by presenting AR features at or around the drop-off location. Furthermore, the techniques described herein may also be used in the context of shared vehicles or any other transportation services, such as scooters, bicycles, autonomous vehicles, ride-for-hire services, taxi services, or any other vehicles which may be used to transport one user from a pickup location to a drop-off location, and another user may retrieve the vehicle at the drop-off location and travel to another drop-off location.

Example Hardware and Software Components

Figure 1:
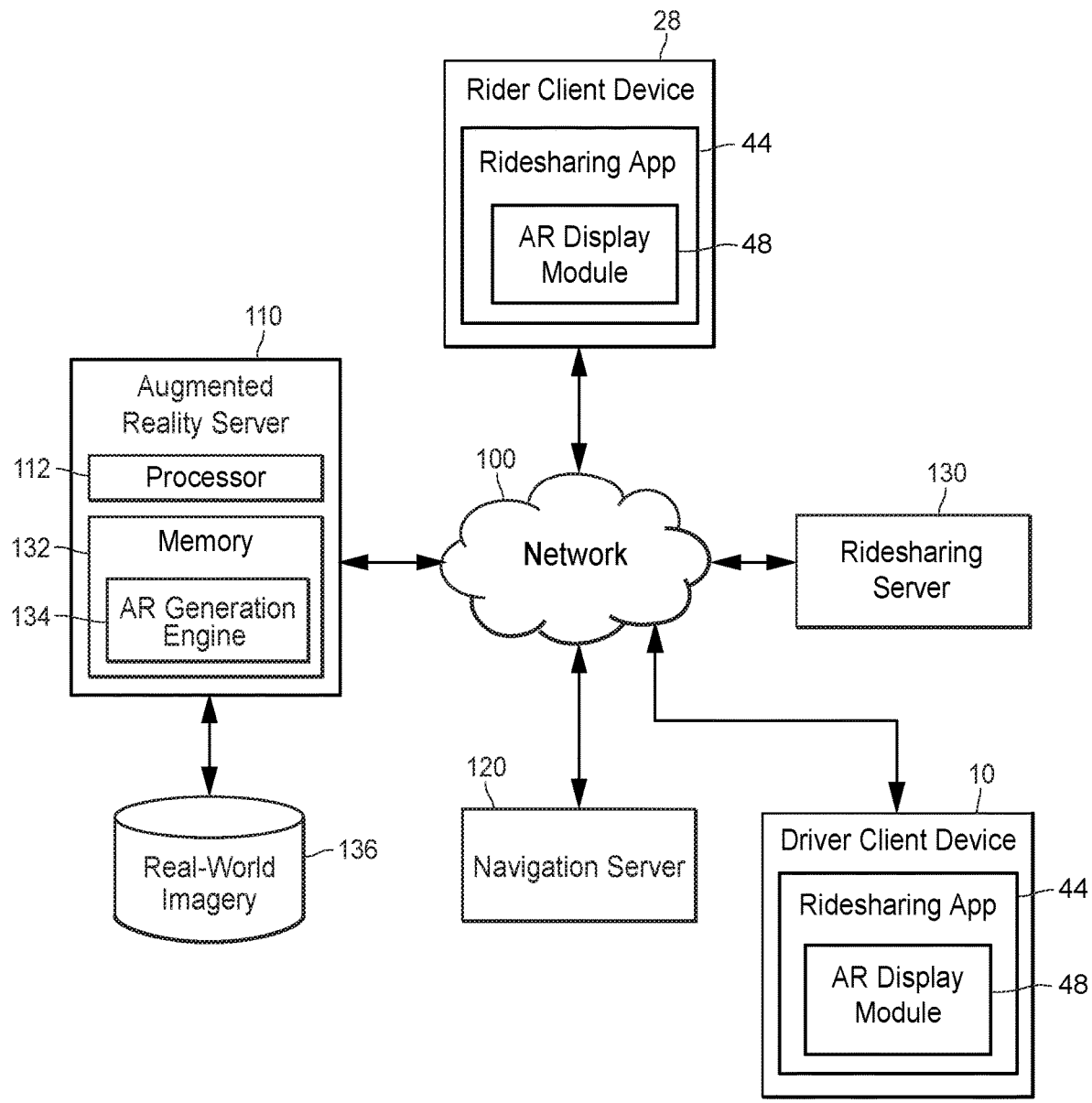
FIG. 1 is a block diagram of an example communication system in which a driver client device and a rider client device can operate to implement the ridesharing AR system.

Referring to FIG. 1, an example communication system in which the techniques outlined above can be implemented includes a driver client device 10 and a rider client device 28, which may each be portable devices configured to execute one or several ridesharing applications 44. In addition to the driver client device 10 and the rider client device 28, the communication system includes a server device 110, such as an augmented reality server configured to provide augmented reality features overlaying real-world imagery to the driver client device 10 and the rider client device 28. The communication system also includes a navigation server device 120 configured to provide a map display and navigation data to the driver client device 10 and the rider client device 28. Additionally, the communication system 100 includes a ridesharing server device 130 configured to provide ride service functionality. The ride service functionality may include receiving ridesharing requests from passengers, broadcasting the ridesharing requests to drivers in the same areas as the passengers, receiving messages from drivers accepting the requests, and providing pickup locations to the drivers and passengers for retrieving the passengers along with updated location information indicating the distances from the drivers and passengers to the pickup locations.

The driver client device 10, the rider client device 28, the augmented reality server 110, the navigation server 120, and the ridesharing server 130 may be communicatively connected to each other through a network 100. The network 100 may be a public network, such as the Internet, or a private network such as an intranet.

The augmented reality server 110 can be communicatively coupled to a database 136 that stores, in an example implementation, real-world imagery for various geographic areas. In this manner, the augmented reality server 110 may compare real-world imagery from a camera view of the driver client device 10 or the rider client device 28 to the real-world imagery in the database 136 to identify the location and/or orientation of the client device 10, 28. The augmented reality server 110 may also be communicatively coupled to a database that stores augmented reality features, such as shapes and graphics to overlay on real-world imagery. More generally, the server device 110 can communicate with one or several databases that store any type of information that can be used in the augmented reality environment. In some implementations the server device 110 may include several communicatively connected server devices. For example, the rider client device 28 may communicate with the ridesharing server 130 to broadcast a request for ridesharing services to a destination to drivers and receive a driver who accepts the request. The ridesharing server 130 may then communicate with the navigation server 120 to identify a pickup location, and provide map data displaying the pickup location, and the current location of the driver, and navigation data presenting directions to the pickup location. Furthermore, the ridesharing server 130 may communicate with the augmented reality server to receive AR features and their corresponding positions within a camera view in which to present the AR features in an AR mode of the ridesharing application 44 on the rider client device 28.

Figure 2:
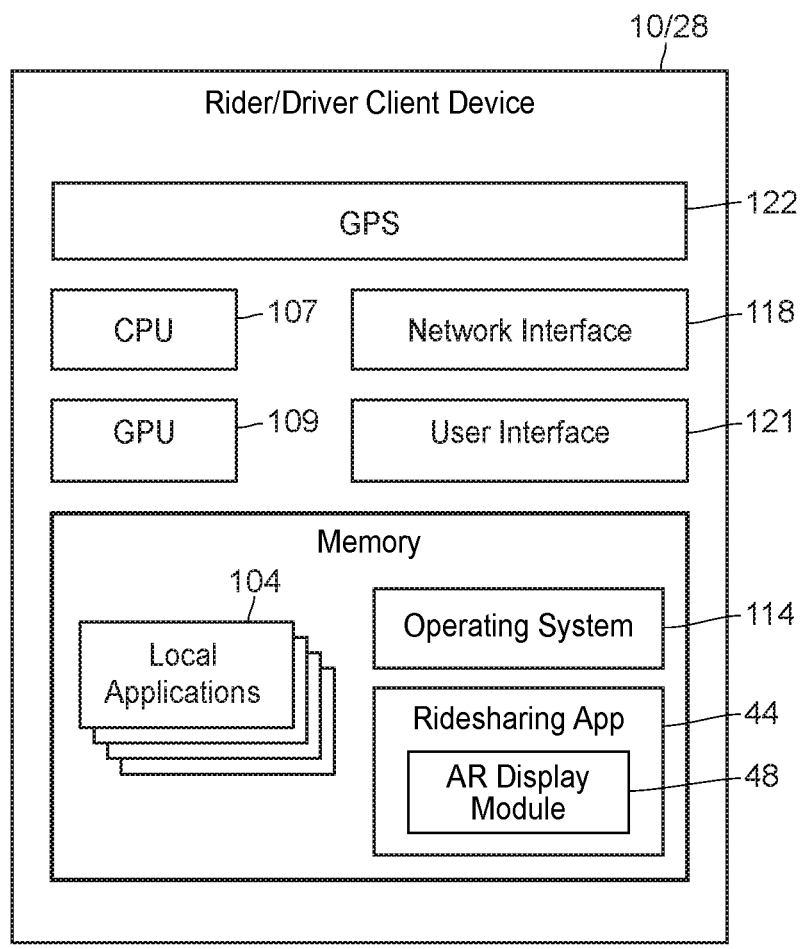
FIG. 2 is a block diagram of an example rider/driver client device that can operate in the system of FIG. 1.

In an example implementation, as shown in FIG. 2, each of the driver client device 10 and the rider client device 28 may be a smart phone or a tablet computer, for example, and includes a memory 106, one or more processors 107, a graphics processing unit (GPU) 109, a network interface 118, a user interface (UI) 121 and one or several sensors 122. The memory 106 can be a non-transitory memory and can include one or several suitable memory modules, such as random access memory (RAM), read-only memory (ROM), flash memory, other types of persistent memory, etc. The UI 121 may be a touch screen, for example. More generally, the techniques of this disclosure can be implemented in other types of devices, such as laptop or desktop computers, a device embedded in a vehicle such as a vehicle head unit, wearable devices, such as smart watches or smart glasses, etc.

Depending on the implementation, the one or more sensors 122 can include a camera, a global positioning system (GPS) module to detect the position of the client device 10, 28, a compass to determine the direction of the client device 10, 28, a gyroscope to determine the rotation and tilt, an accelerometer, etc.

The memory 106 stores an operating system (OS) 114, which can be any type of suitable mobile or general-purpose operating system. The OS 114 can include API functions that allow applications (such as the ridesharing application 44 and another application) to interface with each other, or to retrieve, for example, sensor readings. For example, a software application configured to execute on the client device 10, 28 can include instructions that invoke an OS 114 API for retrieving a current location and orientation of the client device 10, 28 at that instant. The API can also return a quantitative indication of how certain the API is of the estimate (e.g., as a percentage).

The memory 106 also stores the ridesharing application 44 which is configured to provide ridesharing services or other transportation services to passengers or identify passengers in need of ridesharing services or other transportation services to drivers, as well as other applications 104. The ridesharing application 44 can receive requests for ridesharing services or other transportation services from a passenger's current location to a destination and can identify pickup locations for drivers to retrieve passengers. Moreover, the ridesharing application 44 can receive map data in a raster (e.g., bitmap) or non-raster (e.g., vector graphics) format from a map database and/or the navigation server 120. The ridesharing application 44 also can display navigation directions from a driver or passenger's current location to the pickup location and/or from the pickup location to the destination. The navigation directions may include driving or walking directions.

The ridesharing application 44 includes an AR display module 48 which is configured to switch the display of the ridesharing application 44 from a map display mode presenting two-dimensional (2D) map data of a geographic area indicating the rider or the driver's current location, the pickup location, and/or the destination location to an AR mode presenting a camera view of the area in front of the client device 10, 28. In this manner, the ridesharing application 44 conserves data and battery power by presenting a map display until the rider or driver are close to the pickup location at which point the ridesharing application 44 presents the camera view. In response to obtaining a pickup location, the ridesharing application 44 presents a 2D map display of a geographic area indicating the rider or the driver's current location, the pickup location, and navigation directions from the current location to the pickup location. In other embodiments, the map display may be a three-dimensional (3D) or a two-and-a-half dimensional (2.5D) map display.

The ridesharing application 44 continuously or periodically obtains location information indicative of the current location of the driver and/or rider and presents updated locations of the driver and/or rider in the map display. The AR display module 48 determines the distance from the current location of the user of the client device 10, 28 to the pickup location and compares the distance to a threshold distance. In response to determining that the distance is less than the threshold distance, the AR display module 48 switches the display from the map display mode to an AR mode presenting a camera view of the area in front of the client device 10, 28. The AR display module 48 then obtains location information indicative of the current location of the driver and/or rider at a higher frequency than the ridesharing application 44 obtains location information in the map display mode. For example, in the map display mode the ridesharing application 44 may obtain location information for the driver and/or the rider once per second. In the AR mode, the AR display module 48 may obtain location information for the driver and/or the rider twice or three times per second. In this manner, the AR display module 48 has more up-to-date location information for presenting AR features at accurate positions in the camera view. This may be particularly important for highlighting a moving vehicle, for example.

The camera view includes real-world imagery, such as the buildings, streets, vehicles, and people within the field of view of the client device's 10, 28 camera. Furthermore, the AR mode may present AR features overlaying the real-world imagery, such as shapes, colors, and graphics which may be placed on or above a particular vehicle, person, or location indicating the pickup location or highlighting the vehicle of the driver or the person in the camera view who is the passenger. In some implementations, the AR display module 48 may also present an AR feature that indicates a direction in which the rider or the driver needs to turn to see the vehicle or the passenger.

It is noted that although FIG. 2 illustrates the ridesharing application 44 as a standalone application, the functionality of the ridesharing application 44 also can be provided in the form of an online service accessible via a web browser executing on the client device 10, 28, as a plug-in or extension for another software application executing on the client device 10, 28, etc. The ridesharing application 44 generally can be provided in different versions for different respective operating systems. For example, the maker of the client device 10, 28 can provide a Software Development Kit (SDK) for writing or building the ridesharing application 44 for the Android™ platform, another SDK for the iOS™ platform, etc.

Turning back to FIG. 1, the augmented reality server 110 includes one or more processors 112, a network interface (not shown), and a memory 132. The memory 132 may be tangible, non-transitory memory and may include any types of suitable memory modules, including random access memory (RAM), read-only memory (ROM), flash memory, other types of persistent memory, etc. The memory 132 stores instructions executable on the processors 112 which can generate, via an AR generation engine 134, AR features to be displayed by the ridesharing application 44 overlaying real-world imagery. The memory 132, or the memory in another server similarly can store instructions that generate map displays and navigation directions to a pickup location or destination to be displayed by the ridesharing application 44. In some implementations, the ridesharing server 130 may initiate calls to the augmented reality server 110 for AR features to present overlaying real-world imagery in an AR mode of the ridesharing application 44 on the driver client device 10 and/or the rider client device 28.

The AR generation engine 134 may receive a camera view or image from the camera of the driver client device 10 or the rider client device 28, where the camera view depicts real-world imagery, such as buildings, streets, vehicles, and people within the field of view of the camera. The AR generation engine 134 may then determine a location corresponding to the camera view. More specifically, the AR generation engine 134 may compare the camera view to several template camera views stored in the real-world imagery database 136, for example. Each of the template camera views or images may be stored with an indication of the camera viewpoint or location from which the image was taken (e.g., a GPS location specifying latitude and longitude coordinates, a street address, etc.), an indication of the orientation of the camera when the image was taken (e.g., the camera was facing north, thereby indicating that the camera view depicts an area to the north of the viewpoint), indications of the scale or zoom level for the camera view, and/or an indication of a geographic area corresponding to the camera view including indications of precise physical locations at various positions within the camera view based on the scale or zoom level. The orientation of the camera may include a tri-axis orientation indicating the direction the camera is facing (e.g., east, west, north, south, etc.), the tilt angle of the camera (e.g., parallel to the ground), and whether the camera is in the horizontal or vertical position.

For example, for a template camera view, the camera viewpoint may be from the corner of Main Street and State Street, where the camera faced east. The template camera view may depict a width of 5 m, a length of 7 m, and a height of 3 m. The AR generation engine 134 may then create a mapping of the precise location of each pixel or group of pixels in the template camera view based on the camera viewpoint, camera orientation, and size of the template camera view. For example, if the template camera view is 5 m wide, the width of the image is 500 pixels, the orientation of the template camera view is facing east, and the tilt angle is such that the camera is perpendicular to the ground, each pixel may represent a physical width of approximately 1 cm. The camera viewpoint for a template camera view may be determined from the GPS location of the client device that captured the camera view, and the orientation may be determined from a gyroscope and/or a compass included in the client device that captured the camera view.

In any event, the AR generation engine 134 may compare a camera view from the camera of the driver client device 10 or the rider client device 28 to the template camera views to determine the camera viewpoint, orientation, scale or zoom level for the camera view, and/or precise physical locations at various positions within the camera view based on the comparison. For example, the AR generation engine 134 may compare the camera view from the camera of the driver client device 10 or the rider client device 28 to the template camera views using machine learning techniques, such as random forests, boosting, nearest neighbors, Bayesian networks, neural networks, support vector machines, etc.

More specifically, the AR generation engine 134 may identify visual features of each of the template camera views by detecting stable regions within the template camera view that are detectable regardless of blur, motion, distortion, orientation, illumination, scaling, and/or other changes in camera perspective. The stable regions may be extracted from the template camera view using a scale-invariant feature transform (SIFT), speeded up robust features (SURF), fast retina keypoint (FREAK), binary robust invariant scalable keypoints (BRISK), or any other suitable computer vision techniques. In some embodiments, keypoints may be located at high-contrast regions of the template camera view, such as edges within the template camera view. A bounding box may be formed around a keypoint and the portion of the template camera view created by the bounding box may be a feature.

The AR generation engine 134 may create numerical representations of the features to generate template feature vectors, such as the width and height of a feature, RGB pixel values for the feature, a pixel position of a center point of the feature within the image, etc. The AR generation engine 134 may then use the feature vectors as training data to create the machine learning model. If the machine learning technique is nearest neighbors, for example, the AR generation engine 134 may identify visual features of the camera view from the camera of the driver client device 10 or the rider client device 28 to generate feature vectors. The AR generation engine 134 may then compare the feature vectors for the camera view from the camera of the driver client device 10 or the rider client device 28 to the template feature vectors to identify a template camera view having the closest template feature vectors to the feature vectors for the camera view from the camera of the driver client device 10 or the rider client device 28.

The AR generation engine 134 may then determine the camera viewpoint, orientation, scale or zoom level for the camera view, and/or precise physical locations at various positions within the camera view based on the camera viewpoint, orientation, scale or zoom level for the camera view, and/or precise physical locations at various positions within the identified template camera view.

Then the AR generation engine 134 may identify the position within the camera view for presenting an indication of the pickup location based on the precise physical locations assigned to various positions within the camera view. Furthermore, when the camera view is from the camera of the rider client device 28, the AR generation engine 134 may obtain indications of the current location of the driver client device 10. The AR generation engine 134 may identify the position within the camera view for presenting an indication of the driver's vehicle based on the current location of the driver client device 10 and the precise physical locations assigned to various positions within the camera view.

In addition to identifying the position within the camera view for presenting an indication of the driver's vehicle based on the current location of the driver client device 10, the AR generation engine 134 may analyze the camera view using object recognition to identify a vehicle within the camera view. More specifically, the AR generation engine 134 may obtain several template objects from a database. The template objects may include vehicles in addition to other objects, such as buildings, street signs, etc. The AR generation engine 134 may then identify visual features of the template objects by detecting stable regions within the template objects that are detectable regardless of blur, motion, distortion, orientation, illumination, scaling, and/or other changes in camera perspective. The stable regions may be extracted from the template objects using SIFT, SURF, FREAK, BRISK, or any other suitable computer vision techniques.

The AR generation engine 134 may create numerical representations of the features to generate template feature vectors, such as the width and height of a feature, RGB pixel values for the feature, a pixel position of a center point of the feature within the object, etc. Also as described above, the AR generation engine 134 may identify visual features of the camera view or portions of the camera view (also referred to herein as "objects") from the camera of the rider client device 28 to generate feature vectors. The AR generation engine 134 may then compare the feature vectors for the camera view or feature vectors for an object within the camera view to the template feature vectors to identify one or more template objects having the closest template feature vectors to the feature vectors for the camera view from the camera of the rider client device 28. For example, the AR generation engine 134 may identify the top three template objects having the closest template feature vectors to the feature vectors for the camera view. If a majority of the one or more identified template objects is a vehicle, the AR generation engine 134 may identify an object in the camera view as a vehicle.

The AR generation engine 134 may also compare the position of the object in the camera view to a position corresponding to the current location of the driver client device 10. If the position of the object identified as a vehicle in the camera view is within a threshold distance of the position corresponding to the current location of the driver client device 10, the AR generation engine 134 may determine that the position of the object in the camera view is the position of the driver's vehicle.

If the current location of the driver client device 10 corresponds to a position within the camera view and/or an object is identified as a vehicle and is within a threshold distance of that position, the AR generation engine 134 may provide the indication of the driver's vehicle to the rider client device 28 for display on or above the identified position.

Moreover, when the camera view is from the camera of the driver client device 10, the AR generation engine 134 may obtain indications of the current location of the rider client device 28. The AR generation engine 134 may identify the position within the camera view for presenting an indication of the rider based on the current location of the rider client device 28 and the precise physical locations assigned to various positions within the camera view. In addition to identifying the position within the camera view for presenting an indication of the rider based on the current location of the driver client device 28, the AR generation engine 134 may analyze the camera view using face detection and/or body detection to identify a person within the camera view.

Similar to identifying vehicles, the AR generation engine 134 may obtain several template objects from a database. The template objects may include people in addition to other objects, such as vehicles, buildings, street signs, etc. The AR generation engine 134 may then identify visual features of the template objects by detecting stable regions within the template objects that are detectable regardless of blur, motion, distortion, orientation, illumination, scaling, and/or other changes in camera perspective. The stable regions may be extracted from the template objects using SIFT, SURF, FREAK, BRISK, or any other suitable computer vision techniques.

The AR generation engine 134 may create numerical representations of the features to generate template feature vectors, such as skin tones for people, the widths and heights of noses, mouths, eyes, and their respective positions relative to each other, a pixel position of a center point of the feature within the object, etc. Also as described above, the AR generation engine 134 may identify visual features of the camera view or objects in the camera view from the camera of the driver client device 10 to generate feature vectors. The AR generation engine 134 may then compare the feature vectors for the camera view or feature vectors for an object within the camera view to the template feature vectors to identify one or more template objects having the closest template feature vectors to the feature vectors for the camera view from the camera of the driver client device 10. For example, the AR generation engine 134 may identify the top three template objects having the closest template feature vectors to the feature vectors for the camera view. If a majority of the one or more identified template objects is a person, the AR generation engine 134 may identify an object in the camera view as a person.

The AR generation engine 134 may also compare the position of the object in the camera view to a position corresponding to the current location of the rider client device 28. If the position of the object identified as a person in the camera view is within a threshold distance of the position corresponding to the current location of the rider client device 28, the AR generation engine 134 may determine that the position of the object in the camera view is the position of the rider.

If the current location of the rider client device 10 corresponds to a position within the camera view and/or an object is identified as a person and is within a threshold distance of that position, the AR generation engine 134 may provide the indication of the rider to the driver client device 10 for display on or above the identified position.

For simplicity, FIG. 1 illustrates the augmented reality server 110 as only one instance of a server. However, the augmented reality server 110 according to some implementations includes a group of one or more server devices, each equipped with one or more processors and capable of operating independently of the other server devices. Server devices operating in such a group can process requests from the driver client device 10 or the rider client device 28 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

Example Message Diagram

Figure 3:
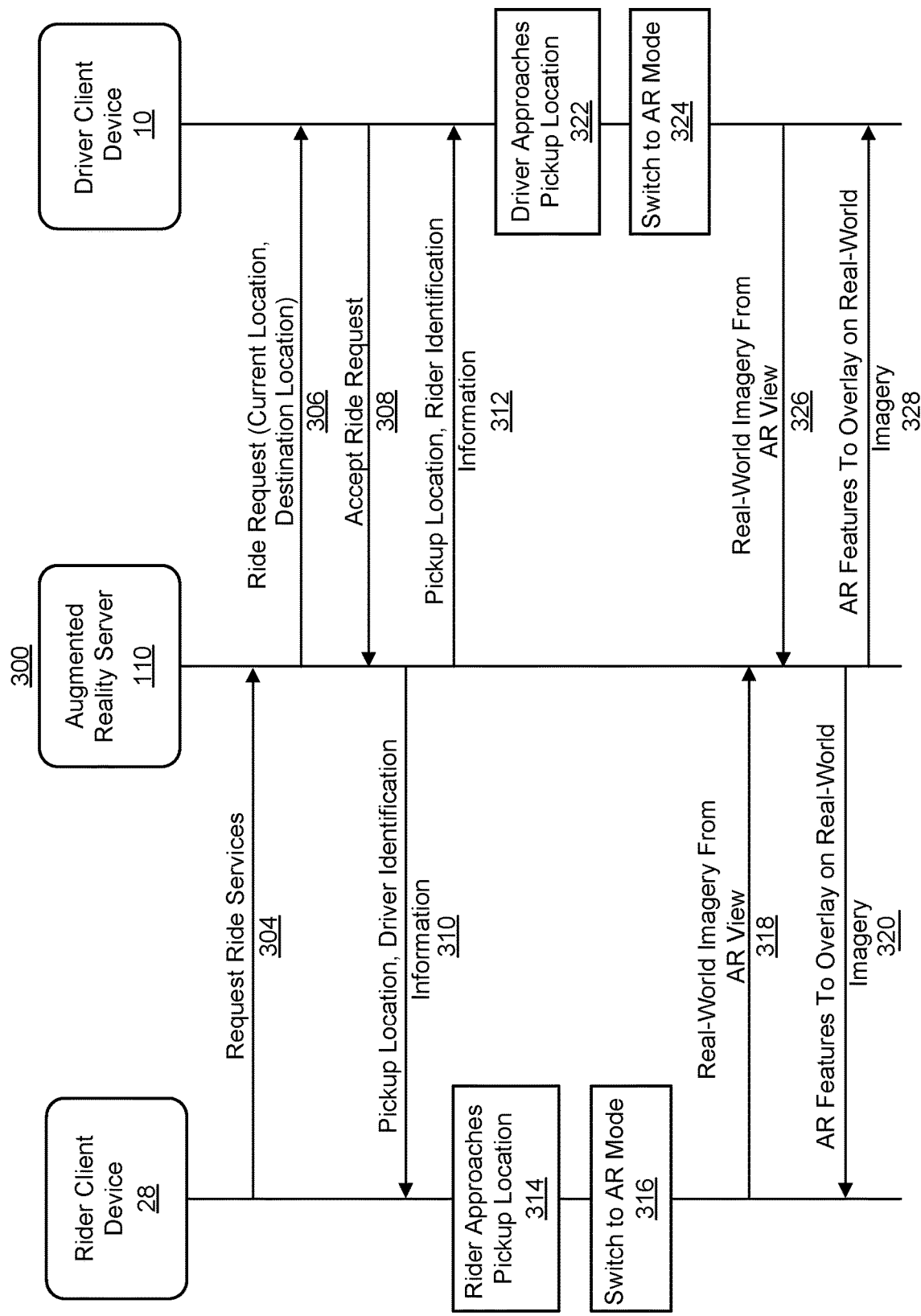
FIG. 3 is an example message diagram illustrating example information communicated between the rider client device, the driver client device, and the augmented reality server to implement the ridesharing AR system.

FIG. 3 illustrates a messaging diagram 300 depicting an example sequence of events for the rider client device 28, the driver client device 10, and the augmented reality server 110 to implement the ridesharing AR system. While the messaging diagram 300 illustrates example communications between the rider client device 28, the driver client device 10, and the augmented reality server 110, the augmented reality server 110 may communicate with the ridesharing server 130 to broadcast a request for ridesharing services or other transportation services to a destination to drivers and receive a driver who accepts the request.

In other implementations, the rider client device 28 and the driver client device 10 may communicate with the ridesharing server 130 to broadcast a request for ridesharing services or other transportation services to a destination to drivers and to accept the request. The ridesharing server 130 may communicate with the augmented reality server 110 to receive AR features and their corresponding positions within a camera view in which to present the AR features in an AR mode of the ridesharing application 44 on the rider client device 28 and/or the driver client device 10.

In any event, the rider client device 28 requests 304 ride services, for example via a ridesharing application 44 to a destination or drop-off location. The augmented reality server 110 broadcasts 304 the ride request to drivers within a threshold radius of the rider's current location, which may include the driver client device 10. The ride request may include the current location of the rider and the destination. In addition to riders providing requests for ride services, users may provide requests for drivers to transport items to drop-off locations. For example, users may deliver food, merchandise, or other goods from a pickup location to a drop-off location via the ridesharing service. In this scenario, the user may be instructed to deliver the item to the pickup location from the item's current location.

The driver client device 10 then accepts 308 the ride request, and the augmented reality server 110 generates a pickup location for retrieving the rider. The pickup location may be within a threshold distance of the rider's current location. Additionally, the pickup location may be selected from a list of predetermined pickup locations stored in a database. The augmented reality server 110 provides 310, 312 the pickup location to the rider client device 28 and the driver client device 10 with identification information for the driver and the rider, respectively. More specifically, the identification information for the driver may include the name of the driver, a picture of the driver, the make, model, and license plate number of the driver's vehicle, or any other suitable identification information. The identification information for the rider may include the name of the rider, a picture of the rider, or any other suitable identification information.

The pickup location may then be presented in map display views of the ridesharing applications 44 executing on the rider client device 28 and the driver client device 10. More specifically, the rider client device 28 may present a 2D map display of a geographic area indicating the rider's current location, the pickup location, and navigation directions from the rider's current location to the pickup location. The current location may be indicated by a dot or other suitable indicator and the pickup location may be indicated by a pin or other suitable indicator. The navigation directions may be indicated by highlighting the route in the 2D map display from the rider's current location to the pickup location, such as overlaying a dotted line over the route.

The driver client device 10 may present a 2D map display of a geographic area indicating the driver's current location, the pickup location, and navigation directions from the driver's current location to the pickup location. The current location may be indicated by a dot or other suitable indicator and the pickup location may be indicated by a pin or other suitable indicator. The navigation directions may be indicated by highlighting the route in the 2D map display from the driver's current location to the pickup location, such as overlaying a dotted line over the route.

The rider client device 28 continuously or periodically determines 314 its current location via the GPS and presents updated locations of the rider in the map display. More specifically, the rider client device 28 may determine its current location at a first frequency. The rider client device 28 then determines the distance from the current location to the pickup location and compares the distance to a threshold distance. In response to determining that the distance is less than the threshold distance, the rider client device 28 switches 316 the display from the map display mode to an AR mode presenting a camera view of the area in front of the rider client device 28. The rider client device 28 then obtains location information indicative of the current location of the rider at a second frequency higher than the first frequency. The location updates for the rider client device 28 may also be provided to the ridesharing server 130 and/or the augmented reality server 110 to present in the map display of the driver client device 10 and to identify the positions of AR features to overlay in the camera view of the driver client device 10.

Likewise, the driver client device 10 continuously or periodically determines 322 its current location via the GPS and presents updated locations of the driver in the map display. More specifically, the driver client device 10 may determine its current location at a first frequency. The driver client device 10 then determines the distance from the current location to the pickup location and compares the distance to a threshold distance. In response to determining that the distance is less than the threshold distance, the driver client device 10 switches 324 the display from the map display mode to an AR mode presenting a camera view of the area in front of the driver client device 10. The driver client device 10 then obtains location information indicative of the current location of the driver at a second frequency higher than the first frequency. The location updates for the driver client device 10 may also be provided to the ridesharing server 130 and/or the augmented reality server 110 to present in the map display of the rider client device 28 and to identify the positions of AR features to overlay in the camera view of the rider client device 28.

When the rider client device 28 switches the display to an AR mode and presents a camera view of the area in front of the rider client device 28, the rider client device 28 transmits 318 the camera view or image from the camera of the rider client device 28 to the augmented reality server 110, where the camera view depicts real-world imagery, such as buildings, streets, vehicles, and people within the field of view of the camera. The augmented reality server 110 may then compare the camera view to several template camera views stored in the real-world imagery database 136, for example. Each of the template camera views or images may be stored with an indication of the camera viewpoint or location from which the image was taken (e.g., a GPS location specifying latitude and longitude coordinates, a street address, etc.), an indication of the orientation of the camera when the image was taken (e.g., the camera was facing north, thereby indicating that the camera view depicts an area to the north of the viewpoint), indications of the scale or zoom level for the camera view, and/or an indication of a geographic area corresponding to the camera view including indications of precise physical locations at various positions within the camera view based on the scale or zoom level. The orientation of the camera may include a tri-axis orientation indicating the direction the camera is facing (e.g., east, west, north, south, etc.), the tilt angle of the camera (e.g., parallel to the ground), and whether the camera is in the horizontal or vertical position.

When the augmented reality server 110 identifies a matching template camera view, the augmented reality server 110 determines the camera viewpoint, orientation, scale or zoom level for the camera view, and/or precise physical locations at various positions within the camera view based on the camera viewpoint, orientation, scale or zoom level, and/or precise physical locations at various positions within the identified template camera view.

Then the augmented reality server 110 identifies AR features to overlay on the real-world imagery in the camera view. More specifically, the augmented reality server 110 may determine whether the pickup location is included in the camera view based on the precise physical locations at various positions within the camera view. The augmented reality server 110 may also determine whether the driver's vehicle is included in the camera view based on the current location of the driver client device 10, the precise physical locations at various positions within the camera view, and/or whether there is an object in the camera view identified as a vehicle.

If the pickup location is not included in the camera view and/or the driver's vehicle is not included in the camera view, the augmented reality server 110 may determine the direction that the rider client device 28 needs to face to view the pickup location and/or the driver's vehicle. The augmented reality server 110 may also determine the tilt angle for the rider client device 28 to view the pickup location and/or the driver's vehicle. The augmented reality server 110 may then determine the orientation of the driver or the pickup location relative to the rider based on the pickup location or the current location of the driver relative to the current location of the rider. The augmented reality server 110 may also determine that the orientation of the rider client device 28 differs from the orientation of the driver or the pickup location relative to the rider.

For example, if the camera of the rider client device 28 is facing north and the pickup location is east of the camera of the rider client device 28, the augmented reality server 110 may determine that the rider needs to turn to the right. Additionally, if the camera of the rider client device 28 is tilted downward toward the ground and the pickup location is further off in the distance from the rider client device 28, the augmented reality server 110 may determine that the rider needs to tilt the rider client device 28 upward. In yet another example, if the camera of the rider client device 28 is tilted toward the sky and the pickup location is in front of the rider client device 28, the augmented reality server 110 may determine that the rider needs to tilt the rider client device 28 downward.

In any event, the augmented reality server 110 may then generate and provide 320 AR features to overlay on the real-world imagery in the camera view. The AR features may include shapes, colors, and graphics which may be placed on or above a particular vehicle, person, or location indicating the pickup location or highlighting the vehicle of the driver or the person in the camera view who is the passenger. The AR features may also include arrows directing the rider to turn or tilt the rider client device 28 to view the pickup location or the driver's vehicle. In some embodiments, the augmented reality server 110 generates and provides AR data to the rider client device 28, which includes a description of the AR feature and the position in which to present the AR feature within the camera view. The rider client device 28 then renders the AR feature at the indicated position. The AR features are illustrated in more detail in FIGS. 4B, 5B, 6, and 7 described below.

When the driver client device 10 switches the display to an AR mode and presents a camera view of the area in front of the driver client device 10, the driver client device 10 transmits 326 the camera view or image from the camera of the driver client device 10 to the augmented reality server 110, where the camera view depicts real-world imagery, such as buildings, streets, vehicles, and people within the field of view of the camera. The augmented reality server 110 may then compare the camera view to several template camera views stored in the real-world imagery database 136, for example.

When the augmented reality server 110 identifies a matching template camera view, the augmented reality server 110 determines the camera viewpoint, orientation, scale or zoom level for the camera view, and/or precise physical locations at various positions within the camera view based on the camera viewpoint, orientation, scale or zoom level, and/or precise physical locations at various positions within the identified template camera view.

Then the augmented reality server 110 identifies AR features to overlay on the real-world imagery in the camera view. More specifically, the augmented reality server 110 may determine whether the pickup location is included in the camera view based on the precise physical locations at various positions within the camera view. The augmented reality server 110 may also determine whether the rider or item is included in the camera view based on the current location of the rider client device 28, the precise physical locations at various positions within the camera view, and/or whether there is an object in the camera view identified as a person or item.

If the pickup location is not included in the camera view and/or the rider or item is not included in the camera view, the augmented reality server 110 may determine the direction that the driver client device 10 needs to face to view the pickup location and/or the rider or item. The augmented reality server 110 may also determine the tilt angle for the driver client device 10 to view the pickup location and/or the rider or item.

The augmented reality server 110 may then generate and provide 328 AR features to overlay on the real-world imagery in the camera view. The AR features may include shapes, colors, and graphics which may be placed on or above a particular vehicle, person, or location indicating the pickup location or highlighting the vehicle of the driver or the person in the camera view who is the passenger. The AR features may also include arrows directing the driver to turn or tilt the driver client device 10 to view the pickup location, the rider, or the item. In some embodiments, the augmented reality server 110 generates and provides AR data to the driver client device 10, which includes a description of the AR feature and the position in which to present the AR feature within the camera view. The driver client device 10 then renders the AR feature at the indicated position. The AR features are illustrated in more detail in FIGS. 4B, 5B, 6, and 7 described below.

Example User Interfaces

Figure 5A:
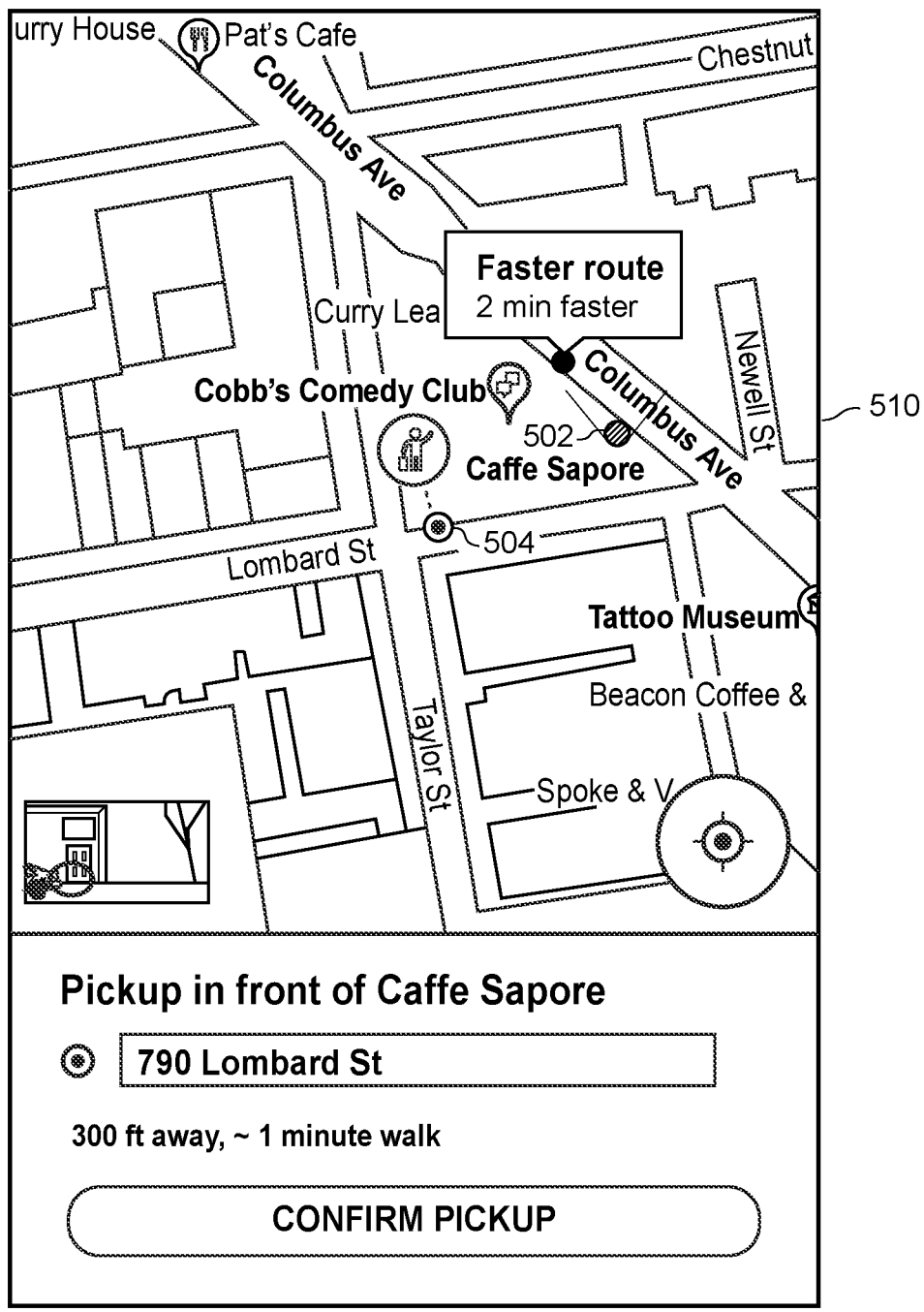
FIG. 5A is another example display of a pickup location in a map display mode of the ridesharing application.
Figure 5B:
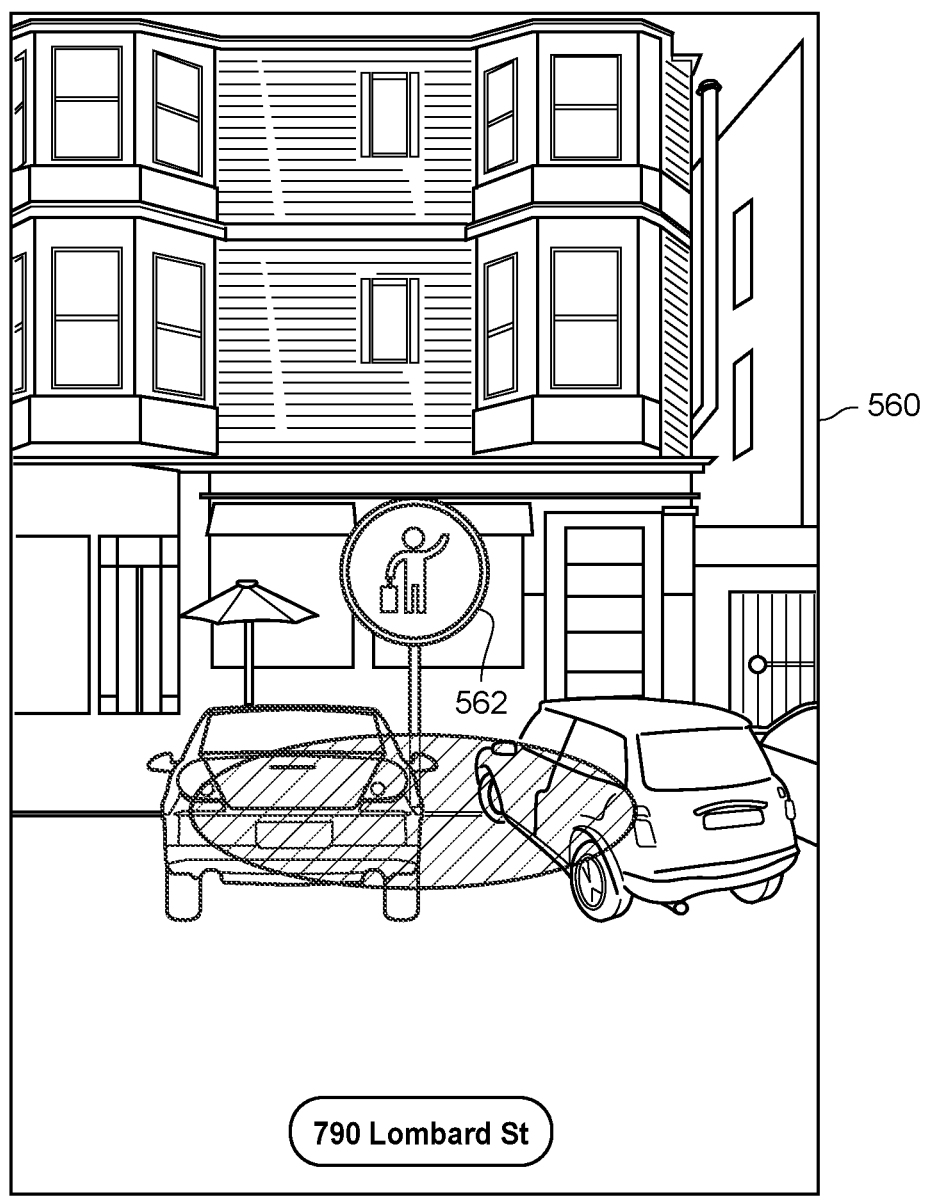
FIG. 5B is an example display of the pickup location of FIG. 5A in an AR mode of the ridesharing application.
Figure 6:
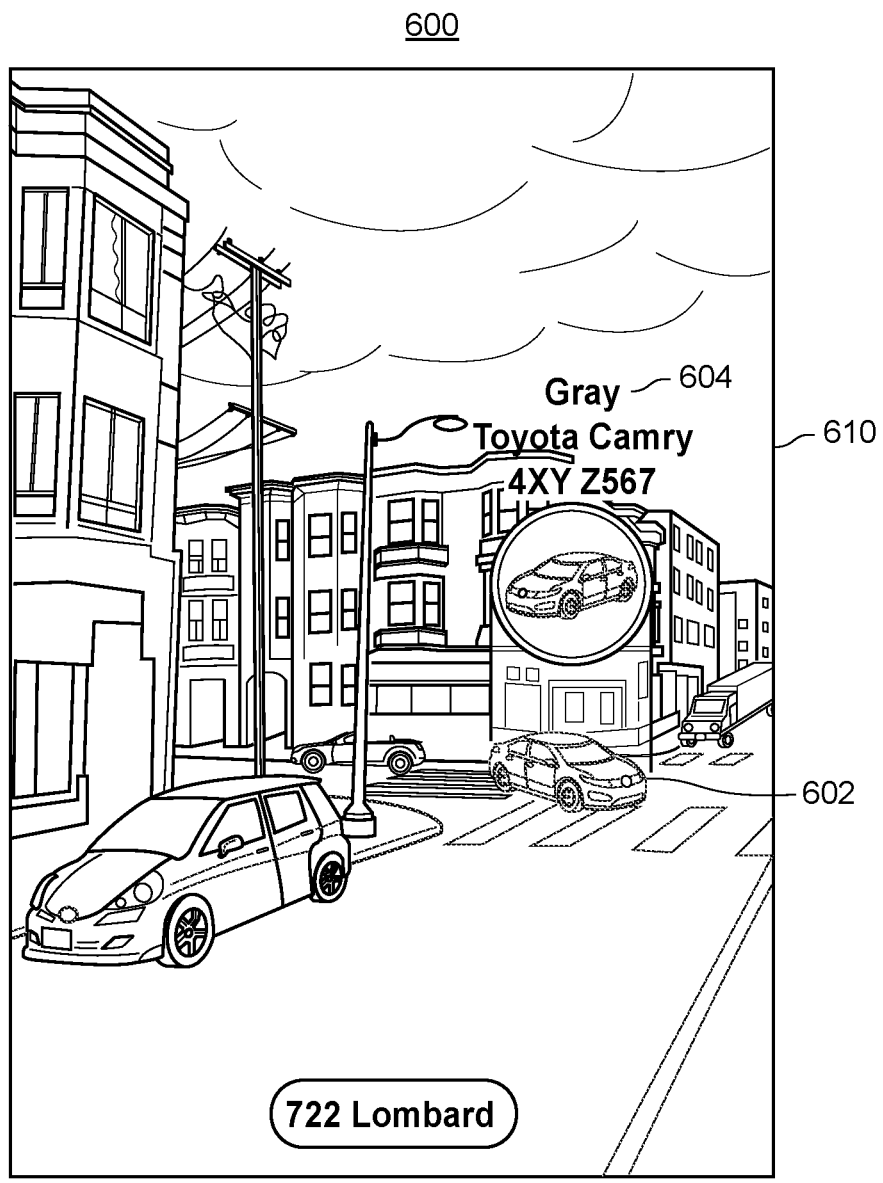
FIG. 6 is an example display of a driver's vehicle in an AR mode of the ridesharing application.

FIGS. 4A-7 illustrate example user interfaces which may be presented on the rider client device 28 and/or the driver client device 10 via the ridesharing application 44 in the map display mode and the AR mode. These are merely a few example user interfaces included for ease of illustration only. Additional or alternative user interfaces may be included as well as additional or alternative AR features presented in the user interfaces. For example, as shown in FIG. 6 the driver's vehicle is highlighted by presenting a graphic indication of the vehicle above the driver's vehicle and a transparent color from the graphic indication to the driver's vehicle. In other implementations, the driver's vehicle may be highlighted with other AR features, such as a circle or rectangle around the driver's vehicle, a pin or arrow above the vehicle, rendering the vehicle in a solid bright color, such as yellow or pink, etc.

In another example, when the camera view from the camera of the rider client device 28 or the driver client device 10 does not include the pickup location, the driver's vehicle, the item, or the rider, the user interface may include AR features directing the rider or driver to turn the rider client device 28 or the driver client device 10 in a particular direction or tilt the rider client device 28 or the driver client device 10 up or down to see the pickup location, the driver's vehicle, the item, or the rider in the camera view. These AR features may be arrows pointing to the left or to the right to instruct the rider or driver to turn the rider client device 28 or the driver client device 10 in a particular direction, or pointing up or down to instruct the rider or the driver to tilt the rider client device 28 or the driver client device 10 up or down.

Figure 4A:
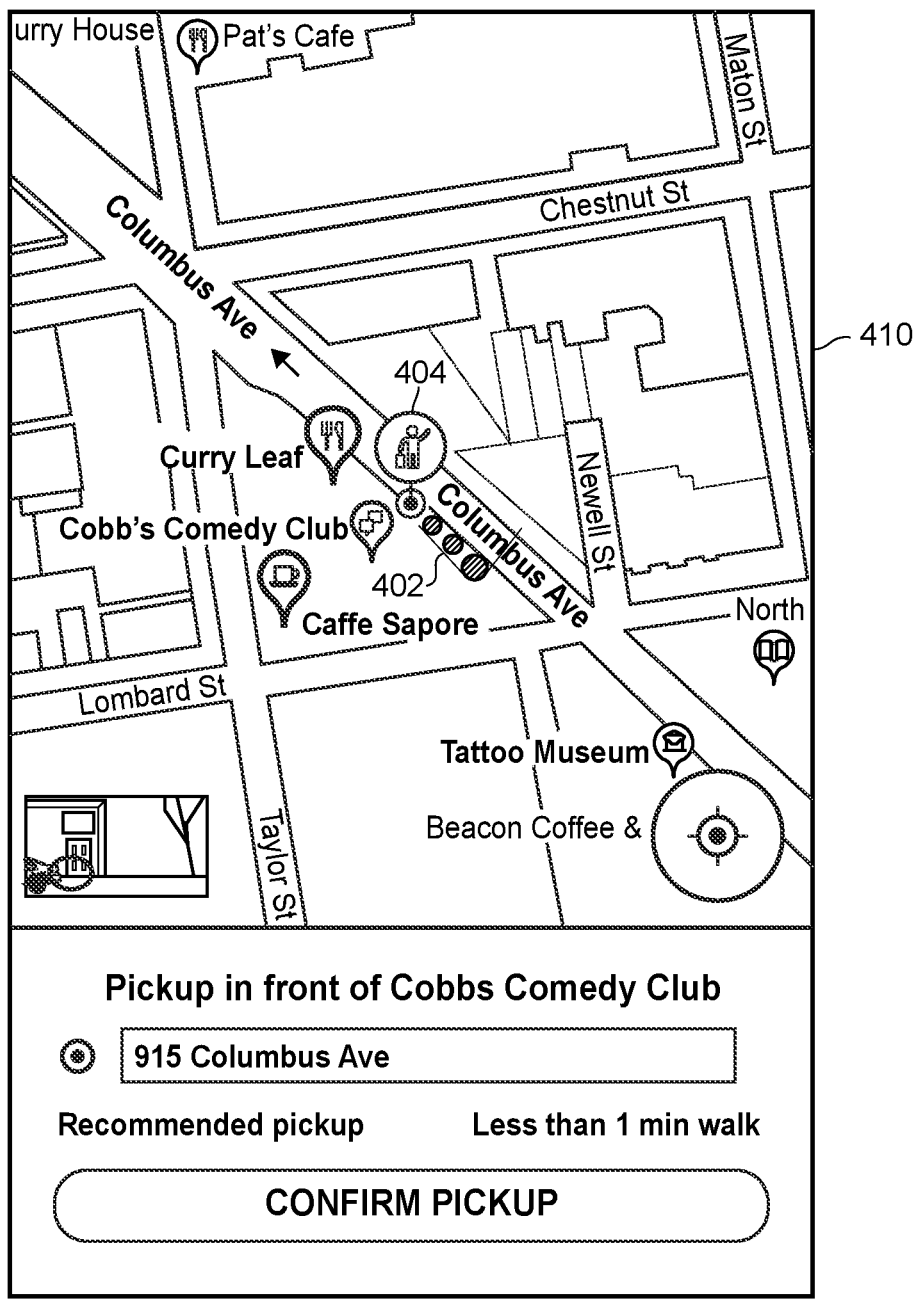
FIG. 4A is an example display of a pickup location in a map display mode of a ridesharing application.

In any event, FIG. 4A illustrates an example display 400 of a pickup location in a map display mode of a ridesharing application 44. The example display 400 may be presented on the rider client device 28 when the rider requests ride services. The example display 400 includes a map display 410 of a geographic area including the rider's current location 402. The map display 410 also includes an indication of a pickup location 404, in the form of a pin. The pickup location is 915 Columbus Avenue in front of Cobbs Comedy Club. As described above, the map display 410 may be presented when the rider's current location 402 is at least a threshold distance away from the pickup location 404 (e.g., 50 m).

Figure 4B:
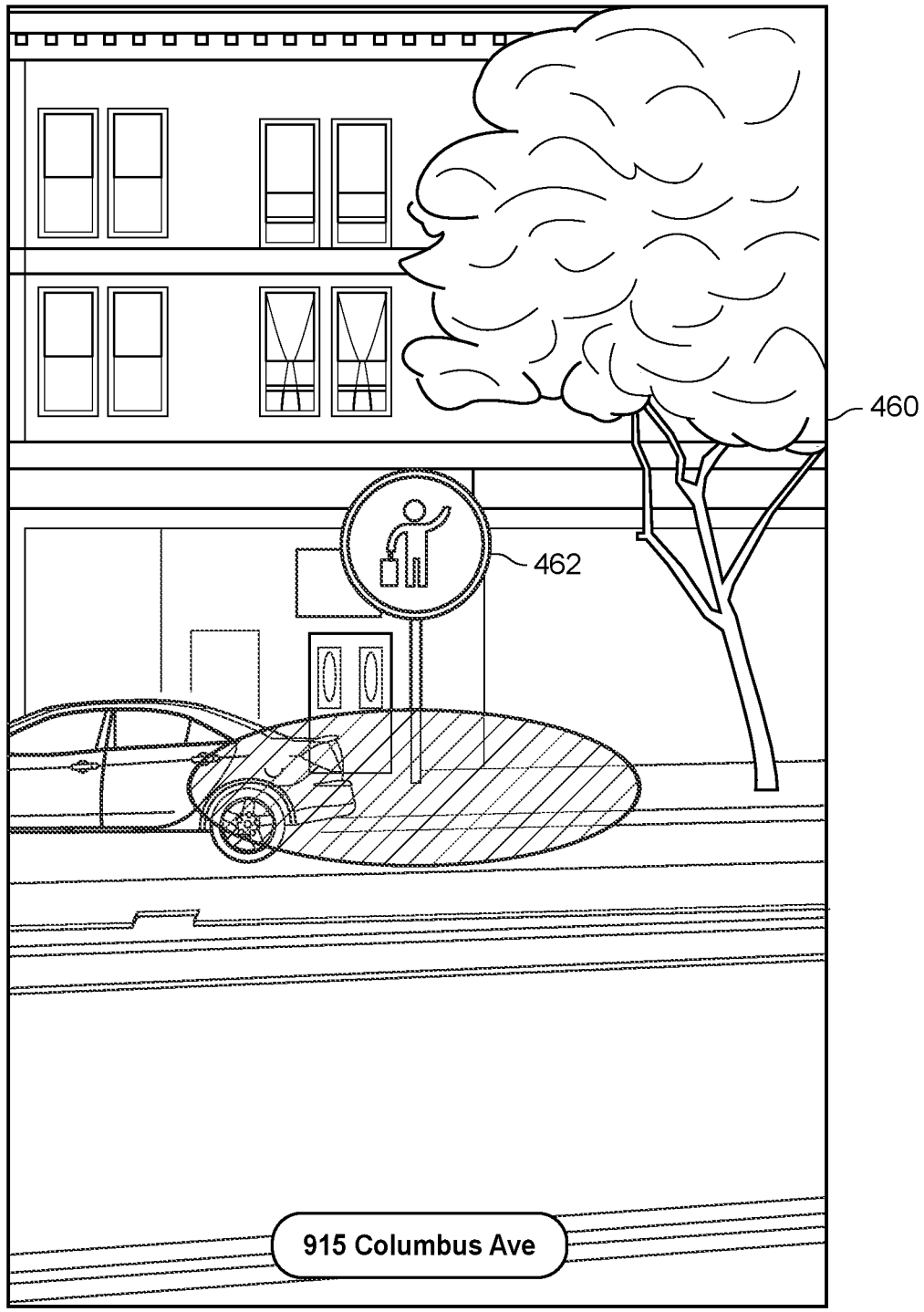
FIG. 4B is an example display of the pickup location of FIG. 4A in an AR mode of the ridesharing application.

FIG. 4B illustrates an example display 450 of the pickup location of FIG. 4A in an AR mode of the ridesharing application 44. The example display 450 may be presented on the rider client device 28 when the rider's current location is within a threshold distance from the pickup location. The example display 450 includes a camera view 460 of real-world imagery in front of the rider client device 28. The camera view 460 includes a street, a tree, a vehicle, a building, etc. The example display 450 also includes an AR feature 462 overlaid on the real-world imagery at a position in the camera view 460 corresponding to the pickup location. As in FIG. 4A, the indication of the pickup location is a pin 462.

FIG. 5A illustrates another example display 500 of a pickup location in a map display mode of a ridesharing application 44. The example display 500 may be presented on the rider client device 28 when the rider requests ride services. The example display 500 includes a map display 510 of a geographic area including the rider's current location 502. The map display 510 also includes an indication of a pickup location 504, in the form of a pin. The pickup location is 790 Lombard Street in front of Caffe Sapore. As described above, the map display 510 may be presented when the rider's current location 502 is at least a threshold distance away from the pickup location 504 (e.g., 50 m).

FIG. 5B illustrates an example display 550 of the pickup location of FIG. 5A in an AR mode of the ridesharing application 44. The example display 550 may be presented on the rider client device 28 when the rider's current location is within a threshold distance from the pickup location. The example display 550 includes a camera view 560 of real-world imagery in front of the rider client device 28. The camera view 560 includes a parking lot, vehicles, a building, etc. The example display 550 also includes an AR feature 562 overlaid on the real-world imagery at a position in the camera view 560 corresponding to the pickup location. As in FIG. 5A, the indication of the pickup location is a pin 562.

FIG. 6 illustrates an example display 600 of a driver's vehicle in an AR mode of the ridesharing application 44. The example display 600 may be presented on the rider client device 28 when the rider's current location is within a threshold distance from the pickup location. The example display 600 includes a camera view 610 of real-world imagery in front of the rider client device 28. The camera view 610 includes a street, vehicles, buildings, etc. The vehicle may include the vehicle 602 of the driver who accepted the request to pick up the rider. An AR feature 604 is overlaid on the real-world imagery that indicates the driver's vehicle 602. In the example display 600, the AR feature 604 is placed above the position in the camera view 610 corresponding to the driver's vehicle 602 to highlight the driver's vehicle 602. The AR feature 604 is a graphic indication that includes a description of the driver's vehicle 602 including the make, model, color, and license plate number, a picture of the driver's vehicle taken at a previous point in time, and a transparent color from the picture of the driver's vehicle to the driver's vehicle 602.

As shown in the camera view 610, the driver's vehicle 602 is currently moving as it appears to be making a right turn toward the rider client device 28. To highlight the moving vehicle, the augmented reality server 110 receives frequent updates of the driver's current location and determines corresponding positions in which to present the AR feature 604 based on the updated location information. The rider client device 28 receives the updated position for presenting the AR feature 604 and displays the AR feature 604 accordingly in the camera view 610. In some embodiments, each time the camera view changes the rider client device 28 may provide the updated camera view to the augmented reality server 110 which may analyze the updated camera view to identify the pickup location, the driver's vehicle, or the rider in the camera view. For example, when the camera view does not include the pickup location, the driver's vehicle, the item, or the rider, the user interface may include AR features directing the rider to turn the rider client device 28 in a particular direction or tilt the rider client device 28 up or down to see the pickup location. As the rider turns the rider client device 28, the rider client device 28 may provide the updated camera views to the augmented reality server 110 to determine whether the pickup location is included in the camera view or the rider needs to continue turning.

Figure 7:
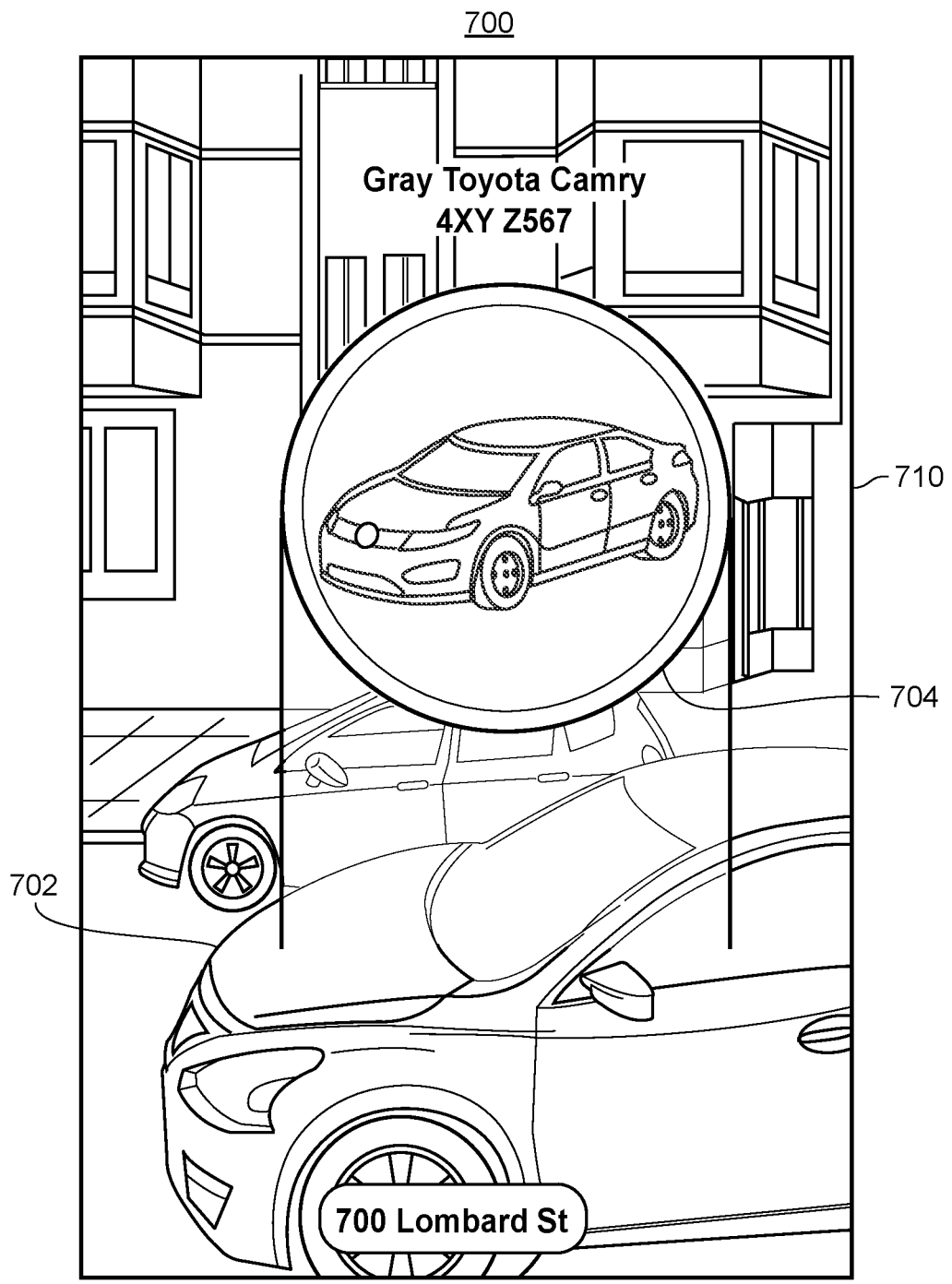
FIG. 7 is another example display of a driver's vehicle in an AR mode of the ridesharing application.

FIG. 7 illustrates another example display 700 of a driver's vehicle in an AR mode of the ridesharing application 44. The example display 700 may be presented on the rider client device 28 when the rider's current location is within a threshold distance from the pickup location. The example display 700 includes a camera view 710 of real-world imagery in front of the rider client device 28. The camera view 710 includes a street, vehicles, a building, etc. The vehicle may include the vehicle 702 of the driver who accepted the request to pick up the rider. An AR feature 704 is overlaid on the real-world imagery that indicates the driver's vehicle 702. In the example display 700, the AR feature 704 is placed above the position in the camera view 710 corresponding to the driver's vehicle 702 to highlight the driver's vehicle 702. The AR feature 704 is a graphic indication that includes a description of the driver's vehicle 702 including the make, model, color, and license plate number, a picture of the driver's vehicle taken at a previous point in time, and a transparent color from the picture of the driver's vehicle to the driver's vehicle 702.

Figure 8:
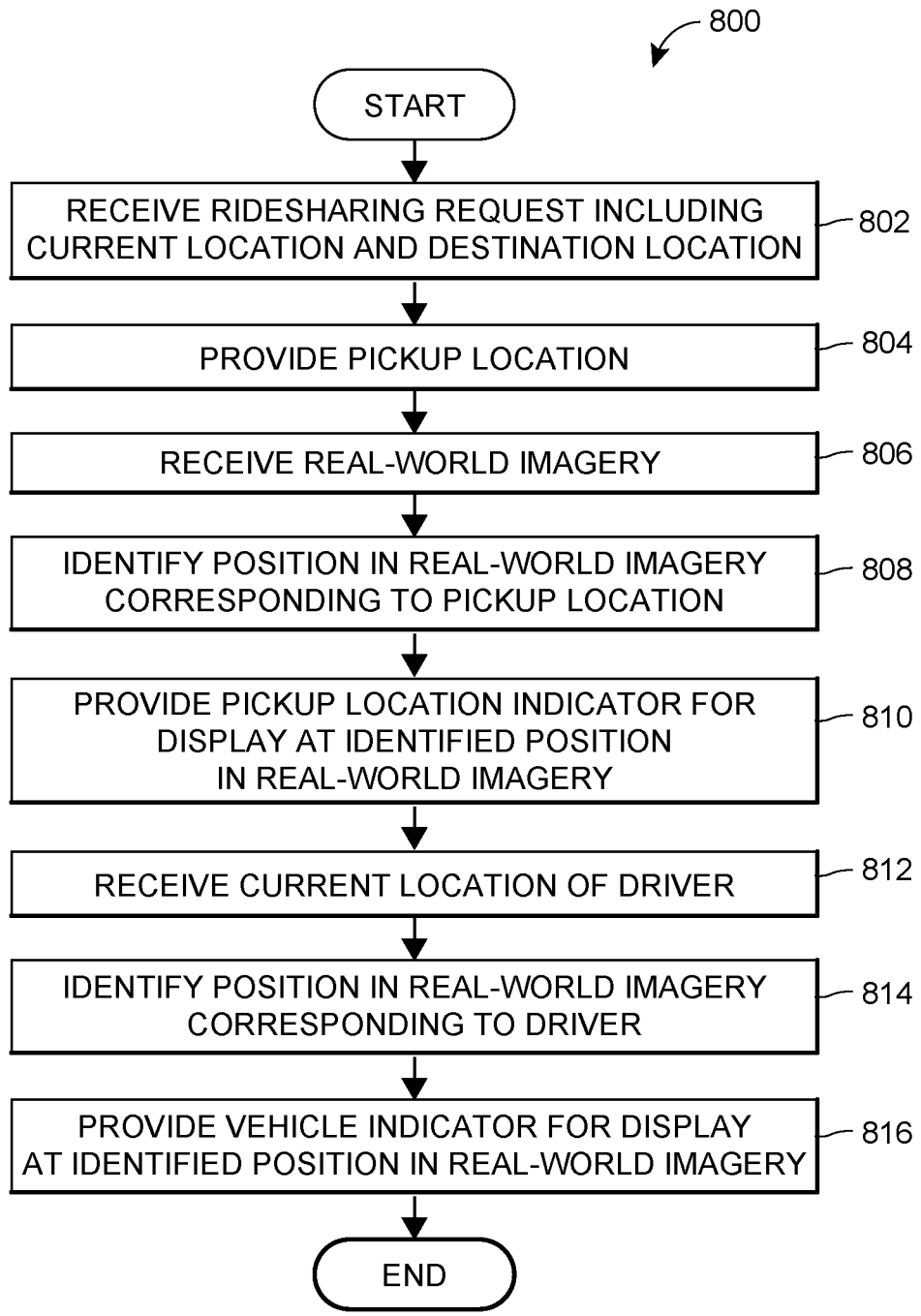
FIG. 8 is a flow diagram of an example method for providing a display of a pickup location in a transportation service, which can be implemented in a server device.

Example Methods for Providing a Display of a Pickup Location in a Transportation Service FIG. 8 illustrates a flow diagram of an example method 800 for providing a display of a pickup location in a transportation service. The method can be implemented in a set of instructions stored on a computer-readable memory and executable at one or more processors of the augmented reality server 110. For example, the method can be implemented by the AR generation engine 134.

At block 802, a ridesharing or other transportation request is received from a rider client device 28 including the rider's current location and a destination. The augmented reality server 110 or a ridesharing server 130 may broadcast the request to drivers within a threshold distance of the rider's current location. Then a pickup location is determined and provided to the rider client device 28 and to a driver client device 10 of a driver that accepts the request to transport the rider (block 804). The pickup location may be within a threshold distance of the rider's current location. Additionally, the pickup location may be selected from a list of predetermined pickup locations stored in a database.

The rider client device 28 may then display an indication of the pickup location and the rider's current location in a map display mode of the ridesharing application 44. Then when the rider's current location is within a threshold distance of the pickup location, the rider client device 28 may display a camera view depicting real-world imagery in front of the camera of the rider client device 28 in an AR mode. At block 806, the augmented reality server 110 receives the camera view or image from the camera of the rider client device 28 depicting the real-world imagery.

Accordingly, the augmented reality server 110 may provide information to display in the AR mode overlaying the real-world imagery to assist the rider or the driver in finding the pickup location. For example, the augmented reality server 110 may identify a position in the camera view corresponding to the pickup location (block 808). More specifically, the augmented reality server 110 may compare the camera view to several template camera views stored in the real-world imagery database 136, for example. Each of the template camera views or images may be stored with an indication of the camera viewpoint or location from which the image was taken, an indication of the orientation of the camera when the image was taken, indications of the scale or zoom level for the camera view, and/or an indication of a geographic area corresponding to the camera view including indications of precise physical locations at various positions within the camera view based on the scale or zoom level.

When the augmented reality server 110 identifies a matching template camera view, the augmented reality server 110 determines the camera viewpoint, orientation, scale or zoom level for the camera view, and/or precise physical locations at various positions within the camera view based on the camera viewpoint, orientation, scale or zoom level, and/or precise physical locations at various positions within the identified template camera view.

The augmented reality server 110 then identifies the position in the camera view corresponding to the pickup location by comparing the precise physical locations at various positions within the camera view to the pickup location. At block 810, the augmented reality server 110 generates and provides an AR feature for indicating the pickup location to be presented at the identified position within the camera view of the rider client device 28. The AR feature may be a pin for example, which may be overlaid on the real-world imagery in the camera view.

Additionally, at block 812, the augmented reality server obtains a current location of the driver client device 10. In some embodiments, the augmented reality server 110 obtains continuous or periodic updates of the driver's current location. The frequency of the updates may increase when the driver's current location is within a threshold distance of the pickup location.

In any event, the augmented reality server 110 identifies a position in the camera view corresponding to the driver's vehicle (block 814). The augmented reality server 110 may identify the position corresponding to the driver's vehicle based on the driver's current location, and/or an object in the camera view identified as a vehicle. At block 816, the augmented reality server 110 generates and provides an AR feature for indicating the driver's vehicle to be presented at or above the identified position within the camera view of the rider client device 28. The AR feature may be a graphic indication that includes a description of the driver's vehicle, a picture of the driver's vehicle taken at a previous point in time, and/or a color for example, which may be overlaid on the real-world imagery in the camera view.

Figure 9:
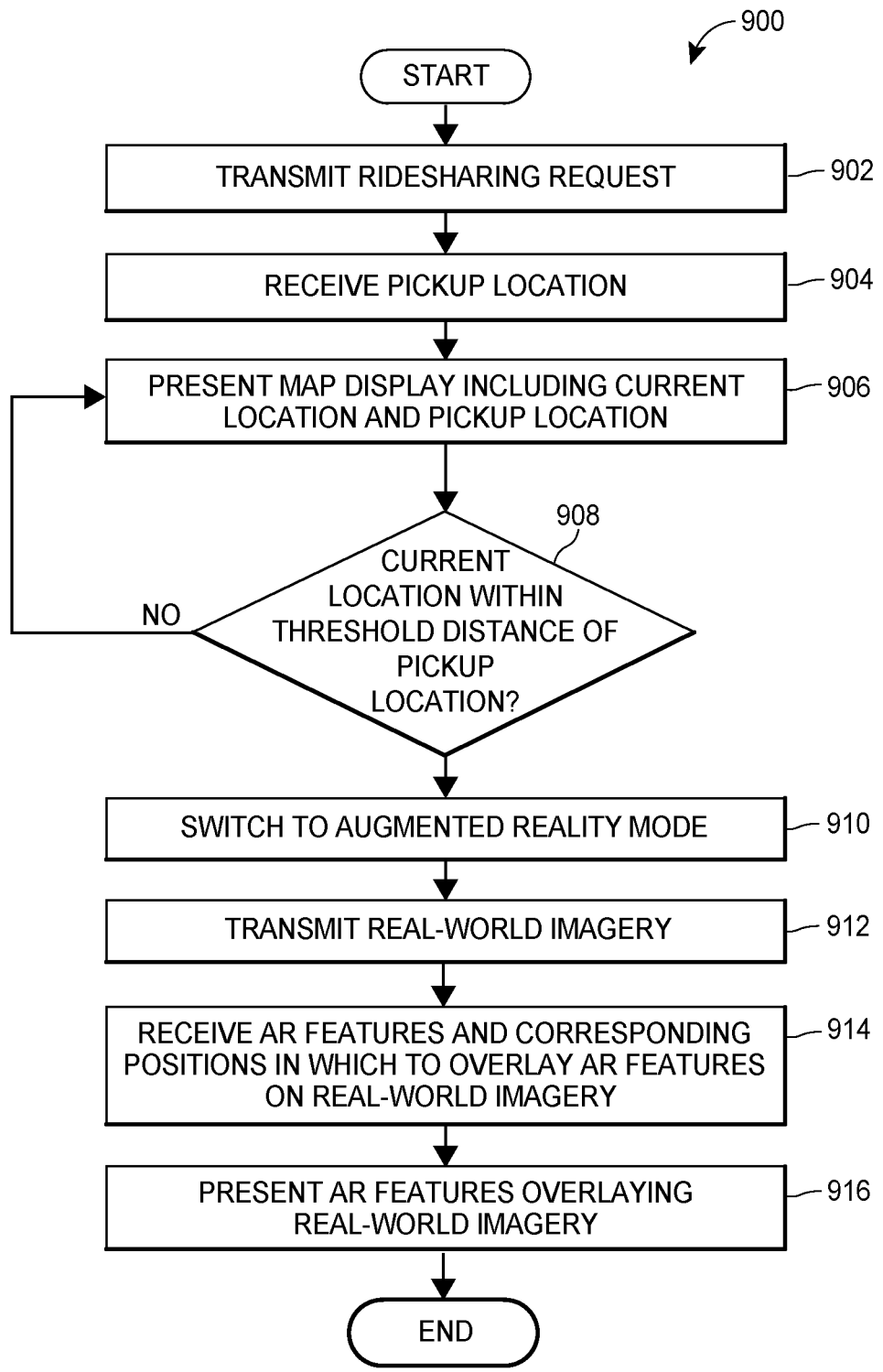
FIG. 9 is a flow diagram of an example method for identifying and presenting a pickup location to a rider in a transportation service, which can be implemented in a rider client device.

FIG. 9 illustrates a flow diagram of an example method 900 for identifying and presenting a pickup location to a rider or driver in a transportation service. The method can be implemented in a set of instructions stored on a computer-readable memory and executable at one or more processors of the rider client device 28. For example, the method can be implemented by the AR display module 48.

At block 902, the rider client device 28 transmits a ridesharing or other transportation request including the rider's current location and a destination. The augmented reality server 110 or a ridesharing server 130 may broadcast the request to drivers within a threshold distance of the rider's current location. Then a pickup location is determined and provided to the rider client device 28 and to a driver client device 10 of a driver that accepts the request to transport the rider (block 904). The pickup location may be within a threshold distance of the rider's current location. Additionally, the pickup location may be selected from a list of predetermined pickup locations stored in a database.

At block 906, the rider client device 28 presents a map display such as the map display 410 as shown in FIG. 4A. The map display presents a geographic area including the rider's current location and the pickup location. Then the rider client device 28 compares the rider's current location to the pickup location and determines whether the rider is within a threshold distance of the pickup location (block 908). If the rider is not within the threshold distance of the pickup location, the rider client device 28 continues to present the map display (block 906). Once the rider is within the threshold distance of the pickup location, the rider client device 28 switches to an AR mode (block 910), and presents a camera view depicting real-world imagery in front of the camera of the rider client device 28. Accordingly, the rider client device 28 may present information in the AR mode overlaying the real-world imagery to assist the rider in finding the pickup location.

The rider client device 28 transmits the camera view or image from the camera of the rider client device 28 depicting the real-world imagery to the augmented reality server 110 (block 912). In response, the augmented reality server 110 compares the camera view to several template camera views stored in the real-world imagery database 136, for example.

When the augmented reality server 110 identifies a matching template camera view, the augmented reality server 110 determines the camera viewpoint, orientation, scale or zoom level for the camera view, and/or precise physical locations at various positions within the camera view based on the camera viewpoint, orientation, scale or zoom level, and/or precise physical locations at various positions within the identified template camera view.

Then the augmented reality server 110 identifies AR features to overlay on the real-world imagery in the camera view. More specifically, the augmented reality server 110 may determine whether the pickup location is included in the camera view based on the precise physical locations at various positions within the camera view. The augmented reality server 110 may also determine whether the driver's vehicle is included in the camera view based on the current location of the driver client device 28, the precise physical locations at various positions within the camera view, and/or whether there is an object in the camera view identified as a vehicle. The AR features may include shapes, colors, and graphics which may be placed on or above a particular vehicle, person, or location indicating the pickup location or highlighting the vehicle of the driver or the person in the camera view who is the passenger. In some implementations, the AR features may also indicate a direction in which the rider or the driver needs to turn to see the vehicle or the passenger.

At block 914, the rider client device 28 receives the AR features and corresponding positions in which to overlay the AR features on the real-world imagery in the camera view. The rider client device 28 then presents the AR features overlaying the real-world imagery in the camera view (block 916).

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. As used herein "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The methods 800 and 900 may include one or more function blocks, modules, individual functions or routines in the form of tangible computer-executable instructions that are stored in a non-transitory computer-readable storage medium and executed using a processor of a computing device (e.g., a server device, a personal computer, a smart phone, a tablet computer, a smart watch, a mobile computing device, or other client computing device, as described herein). The methods 800 and 900 may be included as part of any backend server (e.g., an augmented reality server, a ridesharing server, a map data server, a navigation server, or any other type of server computing device, as described herein), client computing device modules of the example environment, for example, or as part of a module that is external to such an environment. Though the figures may be described with reference to the other figures for ease of explanation, the methods 800 and 900 can be utilized with other objects and user interfaces. Furthermore, although the explanation above describes steps of the methods 800 and 900 being performed by specific devices (such as an augmented reality server 110, a driver client device 10, or a rider client device 28), this is done for illustration purposes only. The blocks of the methods 800 and 900 may be performed by one or more devices or other parts of the environment.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

Still further, the figures depict some embodiments of the example environment for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for providing a display of a pickup location in a ridesharing service through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for providing a display of a pickup location in a transportation service, the method comprising:
   receiving, by one or more processors in a server device, a request to transport a rider to a drop-off location;
   providing, by the one or more processors to a client device, a pickup location for a driver to pick up the rider;
   receiving, at the one or more processors, real-world imagery from a field of view of the client device;
   determining, by the one or more processors, a location corresponding to the real-world imagery by comparing the real-world imagery with template camera views from a plurality of geographic locations stored in a database;
   comparing, by the one or more processors, the determined location to the pickup location; and
   in response to determining that the determined location is within a threshold distance of the pickup location:
   causing, by the one or more processors, the client device to switch from a map display mode to an augmented reality mode; and
   providing, by the one or more processors, an indication of the pickup location to display in the augmented reality mode overlaying the real-world imagery presented in a camera view of the client device based on the comparison to assist the rider or the driver.

2. The method of claim 1, wherein providing an indication of the pickup location within the real-world imagery includes providing a pin at the pickup location within the real-world imagery.

3. The method of claim 1, further comprising:
   determining, by the one or more processors, that the real-world imagery includes a vehicle of the driver;
   wherein providing information to display in the augmented reality mode includes, highlighting, by the one or more processors, the vehicle within the real-world imagery.

4. The method of claim 3, wherein determining that the real-world imagery includes a vehicle of the driver includes:
   receiving, at the one or more processors, an indication of a current location of the driver;
   determining, by the one or more processors, a geographic area included within the real-world imagery;
   comparing, by the one or more processors, the indication of the current location of the driver to the geographic area to determine whether the driver is located within the geographic area included within the real-world imagery.

5. The method of claim 4, further comprising:
   identifying, by the one or more processors, an object at the current location of the driver within the real-world imagery;
   comparing, by the one or more processors, the object to one or more template objects representing vehicles to determine whether the object is a vehicle; and
   determining, by the one or more processors, that the real-world imagery includes the vehicle of the driver in response to determining that the object is a vehicle.

6. The method of claim 1, further comprising:
   determining, by the one or more processors, an orientation of the client device of the rider;
   obtaining, at the one or more processors, a current location of the rider and a current location of the driver;
   identifying, by the one or more processors, an orientation of the driver relative to the rider based on the current location of the driver relative to the current location of the rider; and
   determining, by the one or more processors, that the orientation of the client device of the rider is different from the orientation of the driver relative to the rider;
   wherein providing information to display in the augmented reality mode overlaying the real-world imagery includes providing, by the one or more processors, an indication of a direction for the rider to turn to face the driver and display a vehicle of the driver in the real-world imagery.

7. A method for identifying and presenting a pickup location to a rider in a transportation service, the method comprising:
   transmitting, by one or more processors in a client device of a user, a request to transport the user to a drop-off location;
   receiving, at the one or more processors, a pickup location for a vehicle to pick up the user;
   providing, via a user interface, an interactive digital map of a geographic area including an indication of the pickup location and an indication of a current location of the user in a map display mode; and
   in response to determining that the current location of the user is within a threshold distance of the pickup location, switching, via the user interface, from the map display mode to an augmented reality mode that presents real-world imagery in a camera view of the client device along with information overlaying the real-world imagery to assist the user, including providing an indication of the pickup location within the real-world imagery in the camera view of the client device.

8. The method of claim 7, further comprising:
periodically receiving, at the one or more processors, a current location of a driver of the vehicle at a first frequency; and
in response to determining that the current location of the driver is within a threshold distance of the pickup location, periodically receiving, at the one or more processors, the current location of the driver at a second frequency higher than the first frequency.

9. The method of claim 7, further comprising:
receiving, at the one or more processors, an indication that the real-world imagery includes the vehicle of the driver and a position within the real-world imagery of the vehicle;
wherein switching to the augmented reality mode that presents information overlaying the real-world imagery to assist the user includes highlighting, by the one or more processors, the vehicle within the real-world imagery.

10. The method of claim 7, wherein providing an indication of the pickup location within the real-world imagery includes providing a pin at the pickup location within the real-world imagery.

11. The method of claim 7, further comprising:
determining, by the one or more processors, an orientation of the client device of the user; and
obtaining, by the one or more processors, an indication of an orientation of the vehicle relative to the user based on a current location of the vehicle relative to the current location of the user;
wherein switching to the augmented reality mode that presents information overlaying the real-world imagery to assist the user includes presenting, by the one or more processors overlaying the real-world imagery, an indication of a direction for the user to turn to face the vehicle, so that the vehicle is displayed in the real-world imagery.

12. A method for identifying and presenting a pickup location to a driver in a transportation service, the method comprising:
receiving, by one or more processors in a client device of a driver, a request to transport accepting the request;
a rider or item to a drop-off location;
receiving, at the one or more processors, a pickup location;
providing, via a user interface, an interactive digital map of a geographic area including navigation directions from a current location of the driver to the pickup location in a map display mode;
in response to determining that the current location of the driver is within a threshold distance of the pickup location, switching, via the user interface, from the map display mode to an augmented reality mode that presents real-world imagery in a camera view of the client device along with information overlaying the real-world imagery to assist the driver, including providing an indication of the pickup location within the real-world imagery in the camera view o the client device.

13. The method of claim 12, further comprising:
periodically receiving, at the one or more processors, a current location of the rider requesting transportation at a first frequency; and
in response to determining that the current location of the rider is within a threshold distance of the pickup location, periodically receiving, at the one or more processors, the curren location of the rider at a second frequency higher than the first frequency.

14. The method of claim 12, further comprising:
receiving, at the one or more processors, an indication that the real-world imagery includes the rider or the item and a position within the real-world imagery of the rider;
wherein switching to the augmented reality mode that presents information overlaying the real-world imagery to assist the driver includes highlighting, by the one or more processors, the rider or the item within the real-world imagery.

15. The method of claim 12, wherein providing an indication of the pickup location within the real-world imagery includes providing a pin at the pickup location within the real-world imagery.

16. The method of claim 12, further comprising:
determining, by the one or more processors, an orientation of the client device of the driver; and
obtaining, by the one or more processors, an indication of an orientation of the rider or the item relative to the driver based on a current location of the rider or item relative to the current location of the driver;
wherein switching to the augmented reality mode that presents information overlaying the real-world imagery to assist the driver includes presenting, by the one or more processors overlaying the real-world imagery, an indication of a direction for the driver to turn to face the rider or item, so that the rider or item is displayed in the real-world imagery.

* * * * *